(12) United States Patent
Lai et al.

(10) Patent No.: US 6,795,618 B2
(45) Date of Patent: Sep. 21, 2004

(54) OPTICAL FIBER COUPLING SYSTEM

(75) Inventors: Bou-Yen Lai, Chiai Hsien (TW); Shing-Lung Ting, Kaohsiung Hsien (TW); Shih-Chen Chou, Miaoli (TW); Chiao-Lin Kuo, Kaoshiung (TW)

(73) Assignee: U-Conn Technology Inc., Hsinchu (TW)

( * ) Notice: Subject to any disclaimer, the term of this patent is extended or adjusted under 35 U.S.C. 154(b) by 313 days.

(21) Appl. No.: 10/004,741

(22) Filed: Dec. 2, 2001

(65) Prior Publication Data

US 2002/0076160 A1 Jun. 20, 2002

(30) Foreign Application Priority Data

Dec. 14, 2000 (TW) ............................................ 89221713

(51) Int. Cl.[7] .............................................. G02B 6/26

(52) U.S. Cl. ....................................................... 385/43

(58) Field of Search ........................... 385/43, 95, 134; 356/73.1; 65/377, 385, 406, 408; 700/117

(56) References Cited

U.S. PATENT DOCUMENTS 5,121,453 A * 6/1992 Orazi et al. .................... 355/43

* cited by examiner

Primary Examiner—Walter E. Snow
(74) Attorney, Agent, or Firm—Pro-Techtor International

(57) ABSTRACT

The present invention discloses an optical fiber coupling system controlling an optical fiber coupling device, and the system is characterized by a manufacturing process controlling device. With the present invention, the coupling ratio of the optical fibers to be coupled can be modulated via a window interface unit. Thus, the system provides real-time information and convenient modulation of the optical fiber coupling device simultaneously and clearly.

22 Claims, 6 Drawing Sheets

OPTICAL FIBER COUPLING SYSTEM

BACKGROUND OF THE INVENTION

1. Field of the Invention

The present invention relates to an optical fiber coupling system, and particularly to a system controlling an optical fiber coupling device.

2. Description of the Related Art

Generally, it is necessary to distribute a signal stream for use in optical fiber transmission. For example, a signal may be distributed to a number of terminals, or a signal stream with consecutive signals transmitted in an optical fiber may be respectively sent to different terminals. In this case, it is required to apply an optical fiber coupling device for coupling a plurality of optical fibers.

FIG. 1 shows a basic structure of a conventional optical fiber coupling device. The conventional optical fiber coupling device has a guide track 50 and two stretching blocks 10. Each stretching block 10 has a vacuum pedestal 60 and a power output mechanism 70 for moving the stretching block 10. Each of the stretching blocks 10 is movably installed onto the guide track 50. Then the optical fibers 40 (two as illustrated) are fixed in place on the vacuum pedestal 60, and the stretching blocks 10 move on the guide track 50 by the power output mechanism 70 such as a linear movement driver. The two stretching blocks 10 are relatively linearly movable forming a stretching device so that optical fibers 40 to be coupled are drawn by the vacuum pedestals 60 in a manner of weaving or in parallel contact for stretching. Further, the device 100 has a heating device 20 that movably focuses heat on the weaving node (contact node) 40a by conducting inflammable gas, such as hydrogen, so that the optical fibers fuse together by the combined stretching force and heat. Finally, the packaging device 30 packs the contact node 40a with a package element, such as a steel tube, to protect the contact node 40a.

In FIG. 1, the optical fiber coupling device is provided with plural devices for driving to control the devices described above. The plural devices include a first, a second and a third auto-control devices 11, 21 and 31 provided inside, and first and a second activating devices 22 and 32. The function of these plural devices will be described hereinafter.

When receiving a first driving signal DS1, the first auto-control device 11 moves the stretching blocks 10 to a predetermined position according to a first moving parameter MVP1, and produces a first state parameter STP1 corresponding to the moving of the stretching blocks 10 by a position sensor (not shown) of the stretching blocks 10. The first moving parameter MVP1 includes a stretching block position parameter, and a stretching block speed parameter, each for defining the desired state, that is, the desired position and moving speed of the stretching blocks 10.

When receiving a second driving signal DS2, the second auto-control device 21 moves the heating device 20 to a predetermined position according to a second moving parameter MVP2, and produces a second state parameter STP2 corresponding to the moving of the heating device 20 by a position sensor (not shown) of the heating device 20. The second moving parameter MVP2 includes a heating device position parameter, and a heating device speed parameter, each for defining the desired position and moving speed of the heating device 20.

When receiving a third driving signal DS3, the third auto-control device 31 moves the packaging device 30 to a predetermined position according to a third moving parameter MVP3, and produces a third state parameter STP3 corresponding to the moving of the packaging device 30 by a position sensor (not shown) of the packaging device 30. The third moving parameter MVP3 includes a packaging device position parameter, and a packaging device speed parameter, each for defining the desired position and moving speed of the packaging device 30.

The first activating device 22 drives the heating device 20 to perform the heat focusing operation according to a heating parameter FP when receiving a first activating signal TS1. The hydrogen flow rate, for example, can be modulated by the heating parameter FP, so that heat produced varies.

The second activating device 32 drives the packaging device 30 to perform the packaging when receiving a second activating signal TS2.

When the optical fiber performs the signal stream distribution, the signal distributed has different intensity distribution conditions according to requirements. The distribution generally represents a coupling ratio, which is a scale of signal intensity of the output end of the optical fiber in proportion. By controlling the stretching force in fusing the contact node, the position and optical characteristics of the coupled optical fibers can be varied. Thus, the stretching process and the heating condition greatly affect the coupling result of the optical fiber.

Generally, the optical fiber coupling device has a transmission checking device 80 for measuring the coupling ratio. In FIG. 1, for example, a light input signal S1 is provided to the input end 41 of the optical fiber, and the corresponding light output signals S2, S3 are received from the output ends 42,43. Thus, a heat energy ratio between the output signals S2 and S3 is obtained.

In practical use, if a signal from the input end 41 is to be distributed to the output ends 42, 43, the coupling ratio can be modulated to a certain proportion, such as 50%:50%, 60%:40%, or 90%:10%. If two signals Sa and Sb with different wavelength are respectively directed to each of the output ends 42 and 43, the coupling ratio can be set to such as 0%:100% for Sa, and 100%:0% for Sb.

The transmission checking device 80 provides a light input signal according to a digital light coupling input value CDi to the input end 41, receives at least two corresponding light output signals (not shown) from the output ends 42, 43, and produces at least two digital light coupling output values CDo corresponding to the light output signals.

The optical fiber coupling device as mentioned above requires a manufacturing process controlling device to accurately perform the optical fiber coupling. However, in the conventional optical fiber coupling system, there is a drawback in that no convenient user interface exists. As a result, a user cannot modulate the parameters and check the state of the manufacturing process easily, which reduces the efficiency in reaction to any possible condition occurring in the conventional optical fiber coupling system.

SUMMARY OF THE INVENTION

In view of this, the present invention discloses an optical fiber coupling system, comprising at least an optical fiber coupling device for coupling at least two optical fibers so that a contact node forms on the optical fibers, the contact node comprising at least an input end and at least two output end.

The optical fiber coupling device in the present invention comprises: a stretching device having two relatively linearly movable stretching blocks for stretching the optical fibers to be coupled by relative linear movement; a heating device for movably fusing the contact node by a heat focusing operation; a packaging device for movably packaging the contact node; a first auto-control device that, when receiving a first driving signal, moves the stretching blocks to a determined position according to a first moving parameter and producing a first state parameter corresponding to the moving of the stretching blocks; a second auto-control device that, when receiving a second driving signal, moves the heating device to a determined position according to a second moving parameter and producing a second state parameter corresponding to the moving of the heating device; a third auto-control device that, when receiving a third driving signal, moves the packaging device to a determined position according to a third moving parameter and producing a third state parameter corresponding to the moving of the packaging device; a first activating device that, when receiving a first activating signal, drives the heating device to perform the heat focusing operation according to a heating parameter; a second activating device that, when receiving a second activating signal, drives the packaging device to perform the packaging; and a transmission checking device for providing a light input signal, according to a digital light coupling input value, to the input end of the contact node, receiving at least two corresponding light output signals from the output ends of the contact node, and producing at least two digital light coupling output values corresponding to the light output signals.

The optical fiber coupling system is characterized in a manufacturing process controlling device comprising: a display; a computing unit for respectively computing a light coupling output ratio according to each of the light coupling output values of the output ends to obtain at least a coupling ratio; a process control unit for changing the first, second and third moving parameters and the heat parameter according to a first setup parameter, and coupling the optical fibers by producing the first driving signal in a first period, the second driving signal in a second period, the third driving signal in a third period, the first activating signal in a fourth period, and the second activating signal in a fifth period according to the coupling ratios and a second setup parameter, so that each of the coupling ratios respectively becomes a predetermined coupling ratio; a first setup unit for directly modulating the first, second and third moving parameters, and modulating the first setup parameter; a second setup unit for modulating the second setup parameter; a third setup unit for modulating the coupling ratio; a test unit for producing the digital light coupling input value; and an interface unit for displaying information in the form of window interface on the display, wherein the information comprises the first, second and third moving parameters, the first, second and third state parameters, the first and second setup parameters, the heating parameter, the coupling ratio, and the predetermined coupling ratio.

In the above optical fiber coupling system, the first period, the second period, the third period and the fourth period partially overlap, and the manufacturing process controlling device can be in a computer.

Each of the first, second and third moving parameters comprises a plurality of position parameters and speed parameters of a predetermined moving position of the stretching blocks, the heating device and the packaging device.

The first setup parameter comprises starting position parameters corresponding to origin positions of the stretching blocks, a stretching speed parameter defined by a speed of the stretching blocks in stretching the optical fibers, a heat energy parameter corresponding to energy applied in the focusing heat process of the heating device, and a package position parameter corresponding to a package position of the packaging device.

The process control unit reproduces the first driving signal in a sixth period. The second setup parameter comprises a heating delay parameter related to a first delay corresponding to a difference between commencement of the first period and commencement of the fourth period, and a cooling delay parameter related to a second delay corresponding to a difference between conclusion of the fourth period and commencement of the sixth period.

The second setup parameter further comprises a pre-coupling parameter related to a pre-coupling ratio, and the process control unit controls the conclusion of the fourth period in accordance with variation of the coupling ratio so that the heating device stops focusing heat on the optical fibers when the coupling ratio reaches the pre-coupling ratio.

The manufacturing process controlling device further comprises a login unit for defining at least one linking correlation controlling any of the optical fiber coupling devices.

The manufacturing process controlling device further comprises a storage device having a first database for storing the first and second setup parameters, the heating parameter, the first, second and third moving parameters, and the predetermined coupling ratio. The storage device has a second database for storing the first, second and third state parameters and the coupling ratio change in a sequence of time.

The manufacturing process controlling device comprises a first checking device for comparing the light coupling input value with the light coupling output values according to a first standard value to obtain a corresponding first checking data. The storage device comprises a third database for storing the first standard value, and a fourth database for storing the first checking data.

The manufacturing process controlling device comprises a second checking device for producing the predetermined first, second and third moving parameters and the first, second and third driving signals according to a predetermined second standard value, and checking the first, second and third state parameters to obtain a corresponding second checking data. The second checking device performs the checking when no optical fibers are installed in the optical fiber coupling device.

The storage device comprises a fifth database for storing the second standard value, and a sixth database for storing the second checking data.

The manufacturing process controlling device comprises a third checking device for checking input and output of the plurality of signals between the manufacturing process controlling device and the optical fiber coupling device to obtain a corresponding third checking data. The storage device comprises a seventh database for storing the third standard value, and a eighth database for storing the third checking data.

The manufacturing process controlling device comprises a monitoring device for monitoring any of the linking correlations to obtain a corresponding fourth checking data. The storage device comprises a ninth database for storing the fourth checking data.

The manufacturing process controlling device comprises a data locking device for performing a locking process of the first and second setup parameter, the heating parameter, the first, second and third moving parameters, and the coupling ratio of any of the optical fiber coupling devices. The locking process comprises a password setting process.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
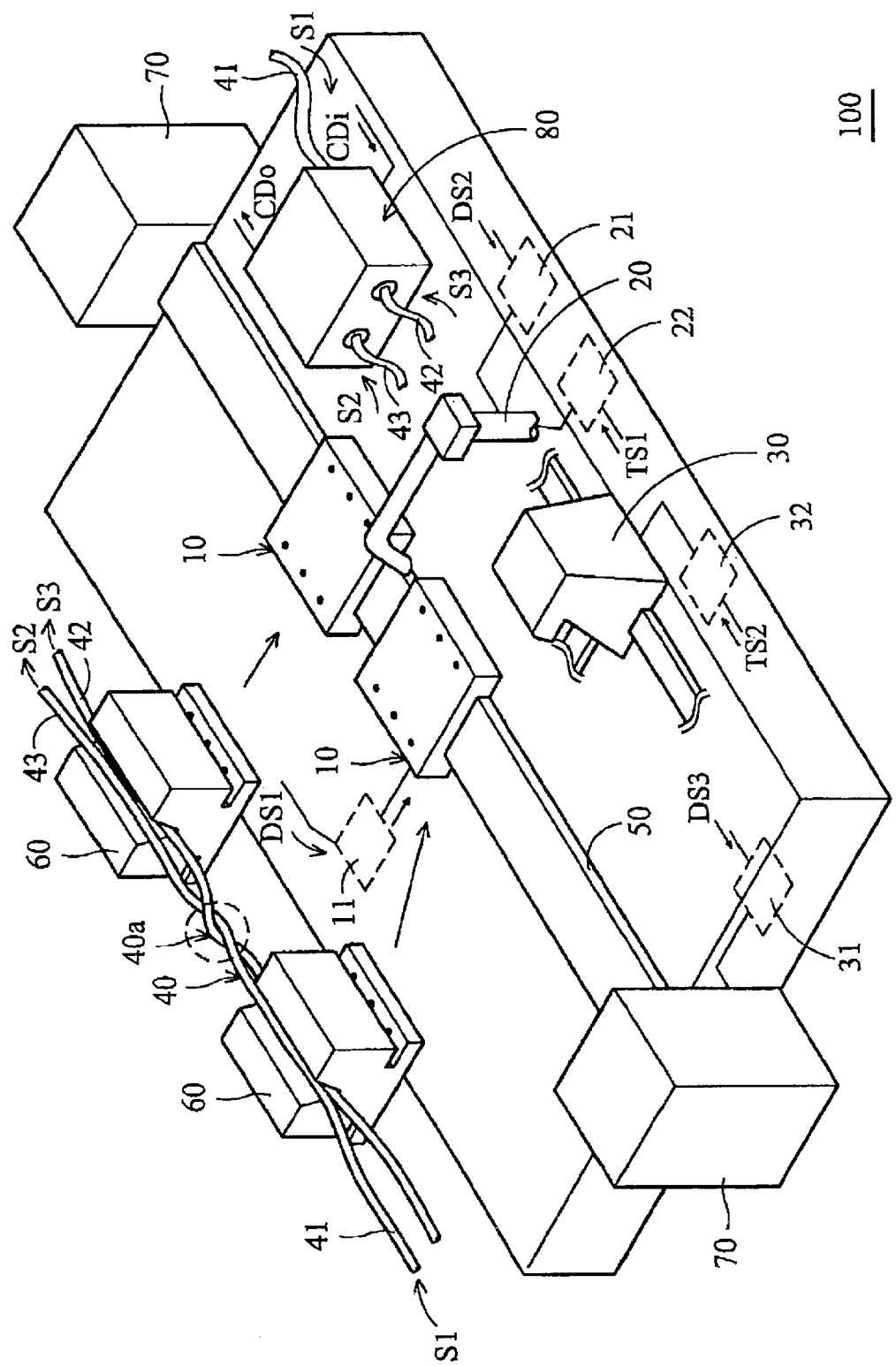
FIG. 1 is a schematic view of a conventional optical fiber coupling device.
Figure 2:
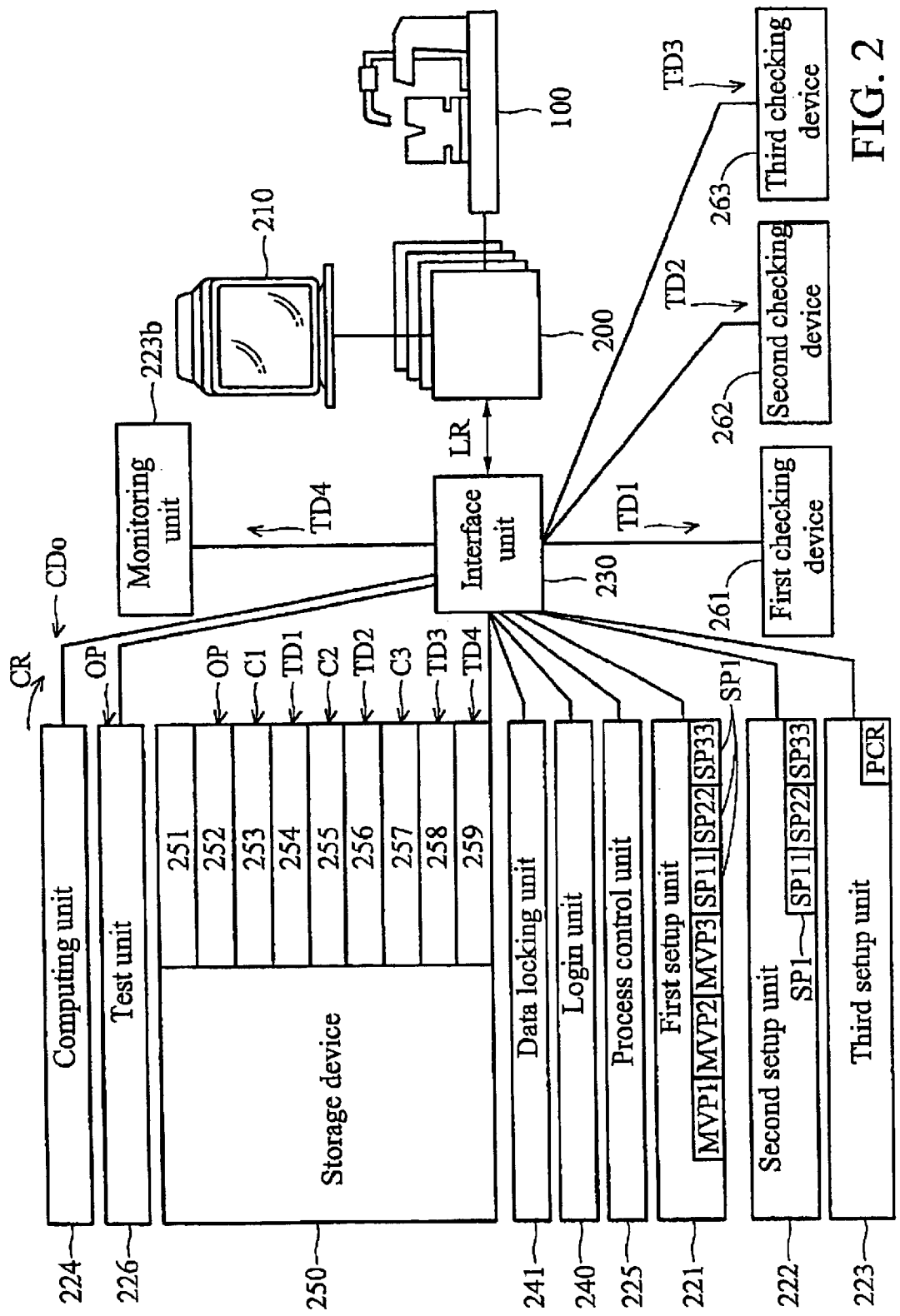
FIG. 2 is a block diagram of the optical fiber coupling system of the present invention.

FIG. 2 is a block diagram of the optical fiber coupling system of an embodiment of the present invention. In this embodiment, it is characterized that the manufacturing process controlling device 200 controls the optical fiber coupling device 100, which is substantially identical to the conventional optical fiber coupling device 100 in FIG. 1. Therefore, the elements and the characteristics of the optical fiber coupling device 100 is not repeatedly described.

The manufacturing process controlling device 200 of this embodiment of the present invention has a display 210, a first setup unit 221, a second setup unit 222, a third setup unit 223, a computing unit 224, a process control unit 225, a test unit 226, and an interface unit 230.

The interface unit 230 provides a window interface on the display 210 for displaying information in the window interface on the display 210. Thus, the user controls and monitors the manufacturing process performed in the optical fiber coupling device 100.

The computing unit 221 respectively calculates a light coupling output ratio according to each of the light coupling output values CDo of the output ends 42, 43 to obtain at least a coupling ratio CR, which is of a major parameter in the optical fiber coupling process.

The process control unit 225 changes the first, second and third moving parameters MVP1, MVP2 and MVP3, and the heat parameter FP according to a first setup parameter SP1. A user can directly modulate the first setup parameter SP1, which contains a plurality of data. Preferably, the first setup parameter SP1 comprises starting position parameters SP11 corresponding to origin positions of the stretching blocks, a stretching speed parameter SP12 defined by a speed of the stretching blocks in stretching the optical fibers, a heat energy parameter SP13 corresponding to energy applied in the focusing heat process of the heating device, and a package position parameter SP14 corresponding to a package position of the packaging device.

Figure 4:
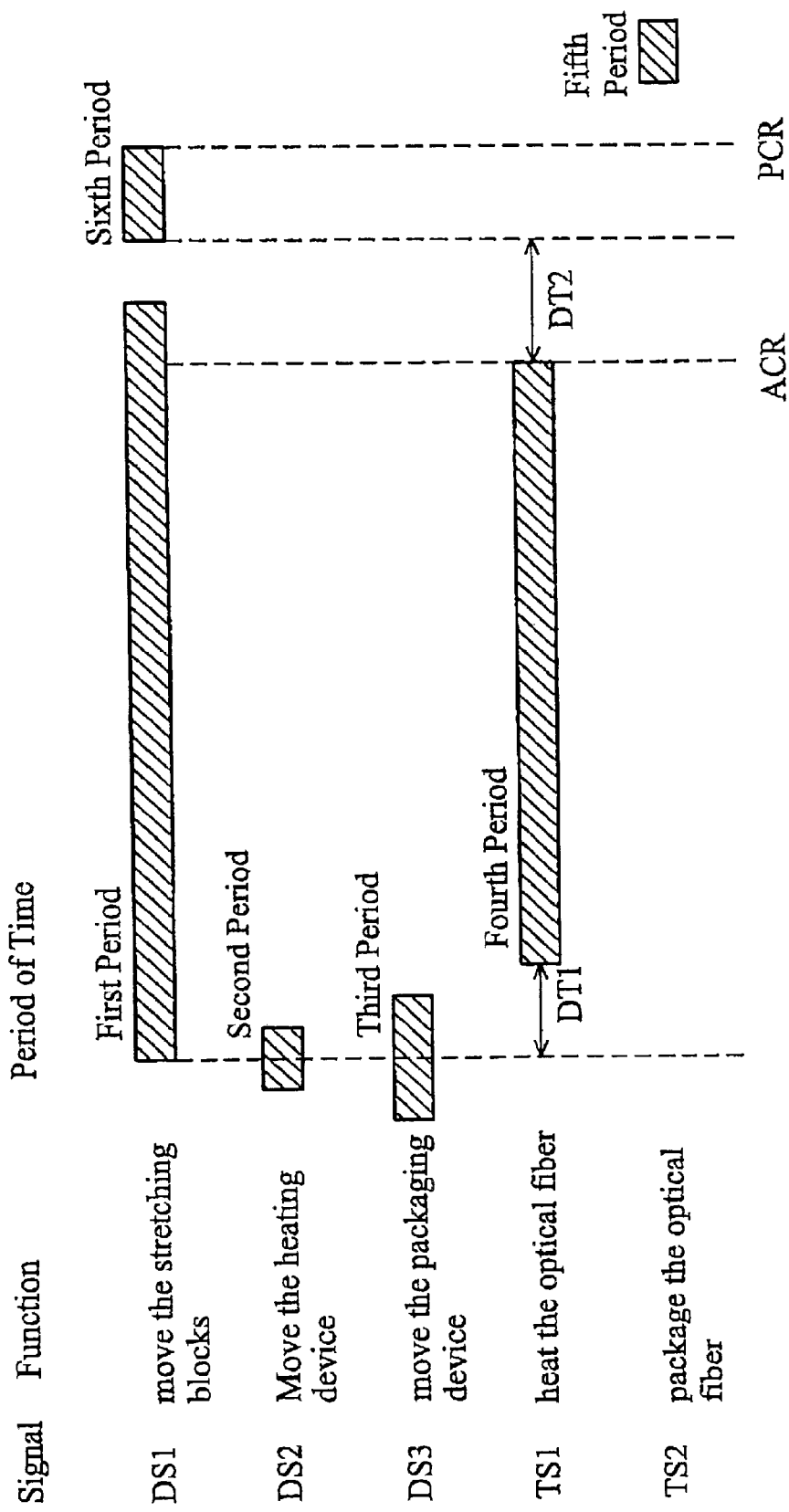
FIG. 4 is a schematic view of the first to the sixth period of an embodiment of the present invention.

Further, the process control unit 225 couples the optical fibers by producing the first driving signal DS1 in a first period, the second driving signal DS2 in a second period, the third driving signal DS3 in a third period, the first activating signal TS1 in a fourth period, and the second activating signal TS2 in a fifth period according to the coupling ratio CR and a second setup parameter SP2, so that each of the coupling ratio CR becomes a predetermined coupling ratio PCR. The first to fifth periods are shown in FIG. 4, in which the first period, the second period, the third period and the fourth period partially overlap. That is, devices can simultaneously operate in the coupling process of the optical fibers 40.

The second setup parameter SP2 contains complicated parameters and data, and will be discussed later.

The first setup unit 221 is for the user to directly modulate the first, second and third moving parameters MVP1, MVP2 and MVP3, and the first setup parameter SP1 via the interface unit 230. In addition, the second setup unit 222 is for the user to modulate the second setup parameter SP2; and the third setup unit 223 is used for the user to modulate the predetermined coupling ratio PCR in the format of, for example, percentage.

Further, the test unit 226 is used for producing the digital light coupling input value CDi.

The manufacturing process controlling device 200 is preferably provided in a computer (not shown), and the parameters and data transmission utilize the input/out port of the computer, and a conventional communication standard, such as RS232. The display 210 is also the computer display, and the user modulates the setup parameters SP1, SP2 by an input device, such as keyboard and mouse, of the computer.

The interface unit 225 displays information on the display, in which the information preferably comprises the first, second and third moving parameters MVP1, MVP2 and MVP3, the first, second and third state parameters STP1, STP2 and STP3, the first and second setup parameters SP1 and SP2, the heating parameter FP, the coupling ratio CR, and the predetermined coupling ratio PCR.

The second setup parameter SP2 will be described hereinafter in detail.

The second setup parameter SP2 in the present embodiment includes various data and parameters, which preferably comprise a heating delay parameter SP21, a cooling delay parameter SP22, and a pre-coupling parameter SP23.

The heating delay parameter SP21 relates to a first delay DT1, as shown in FIG. 4, corresponding to a difference between commencement of the first period and commencement of the fourth period. That is, the heating device 20 does not operate until a period of the first delay DT1 passes after the stretching blocks 10 are activated. Thus, the optical fibers 40 are pre-stretched before heating, and desired coupling will be achieved.

The cooling delay parameter SP22 relates to a second delay DT2, as shown in FIG. 4, corresponding to a difference between conclusion of the fourth period and commencement of the sixth period, in which the process control unit 225 reproduces the first driving signal in the sixth period. That is, the optical fibers 40 are heated, and a period of the second delay DT2 passes, so that the contact node 40a is somewhat cooled, and the stretching process continues to achieve the predetermined coupling ratio. This cooling delay prevents fractures in the heating optical fibers 40.

The pre-coupling parameter SP23 relates to a pre-coupling ratio ACR, generally set lower than the predetermined coupling ratio PCR, and the process control unit 225 controls the conclusion of the fourth period in accordance with variation of the coupling ratio CR so that the heating device 20 stops focusing heat on the optical fibers 40 when the coupling ratio reaches the pre-coupling ratio. This also prevents fracture occurs in the heating optical fibers 40.

Further, additional devices in the present invention will be hereinafter disclosed.

The manufacturing process controlling device 200 further comprises a login unit 240 for defining at least one linking correlation, such as a network linkage, controlling any of the optical fiber coupling devices 100.

Preferably, the manufacturing process controlling device 200 further comprises a storage device 250 having a first database 251, a second database 252, a third database 253, a fourth database 254, a fifth database 255, a sixth database 256, a seventh database 257, a eighth database 258, and a ninth database 259.

The first database 251 stores the first and second setup parameters SP1, SP2, the heating parameter FP, the first, second and third moving parameters MVP1, MVP2 and MVP3, and the predetermined coupling ratio PCR.

The second database 252 stores the first, second and third state parameter STP1, STP2 and STP3, and the coupling ratio change in a sequence of time.

The manufacturing process controlling device 200 comprises a first checking device 261 for comparing the light coupling input value with the light coupling output values according to a first standard value C1 to obtain a corresponding first checking data TD1. The third database 253 stores the first standard value C1, and the fourth database 254 stores the first checking data TD1.

The manufacturing process controlling device 200 further comprises a second checking device 262 for producing the predetermined first, second and third moving parameters MVP1, MVP2 and MVP3, and the first, second and third driving signals DS1, DS2 and DS3 according to a predetermined second standard value C2, and checking the first, second and third state parameters STP1, STP2 and STP3 to obtain a corresponding second checking data TD2. The second checking device 262 performs the checking in a state that no optical fibers 40 are installed in the optical fiber coupling device 100. The fifth database 255 stores the second standard value C2, and the sixth database 256 stores the second checking data TD2.

The manufacturing process controlling device 200 further comprises a third checking device 263 for checking input and output of the plurality of signals between the manufacturing process controlling device 200 and the optical fiber coupling device 100 according to a predetermined third standard value C3 to obtain a corresponding third checking data TD3. The seventh database 257 stores the third standard value C3, and the eighth database 258 stores the third checking data TD3.

The manufacturing process controlling device 200 comprises a monitoring device 270 for monitoring any of the linking correlations to obtain a corresponding fourth checking data TD4. The ninth database 259 stores the fourth checking data TD4.

Further, the manufacturing process controlling device 200 comprises a data locking device 241 for performing a locking process of the first and second setup parameter SP1, SP2, the heating parameter FP, the first, second and third moving parameters MVP1, MVP2 and MVP3, and the predetermined coupling ratio CR of any of the optical fiber coupling devices 100. The locking process comprises a password setting process.

Figure 3A:
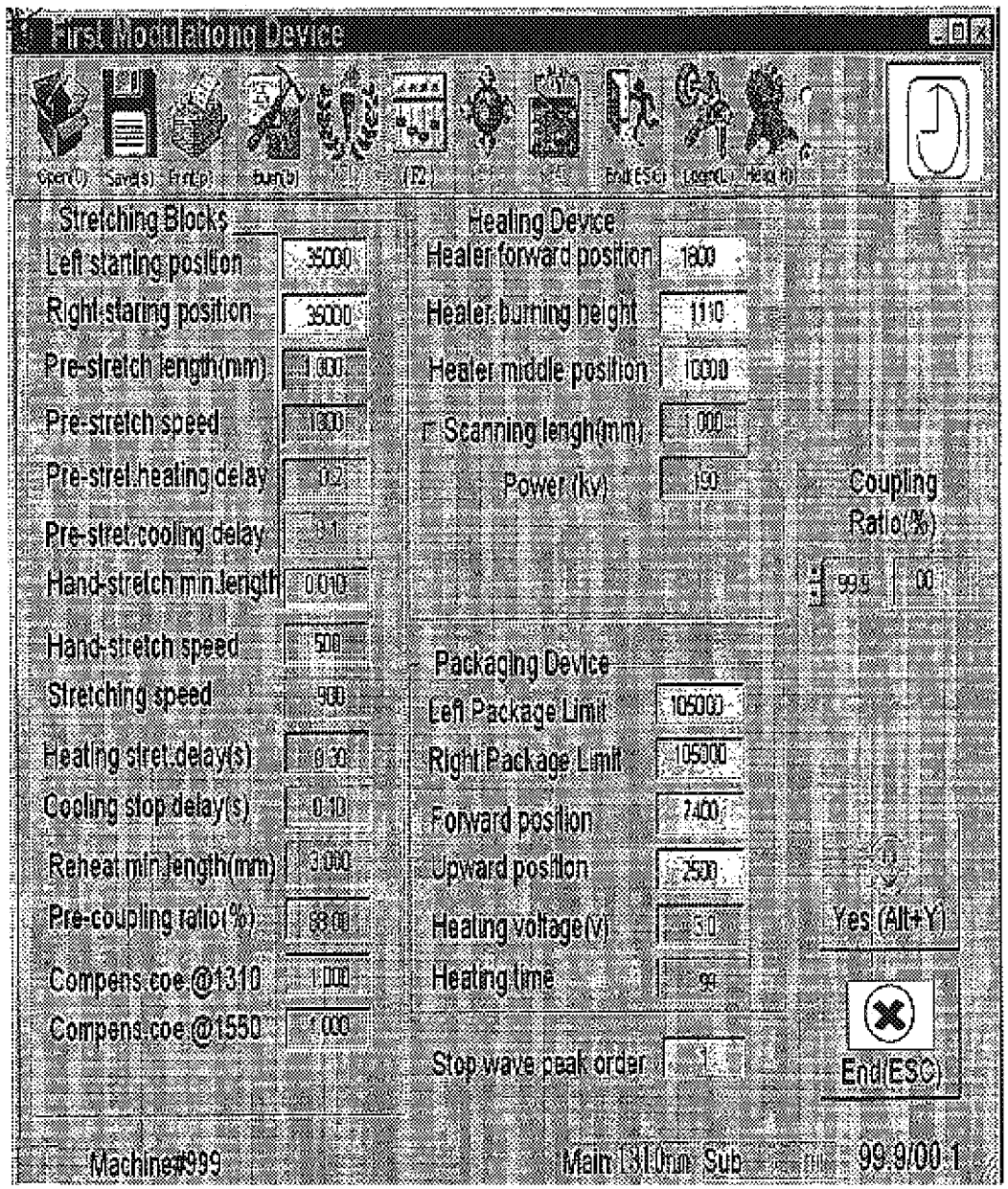
FIGS. 3a to 3c are schematic views of the interface unit of an embodiment of the present invention.
Figure 3B:
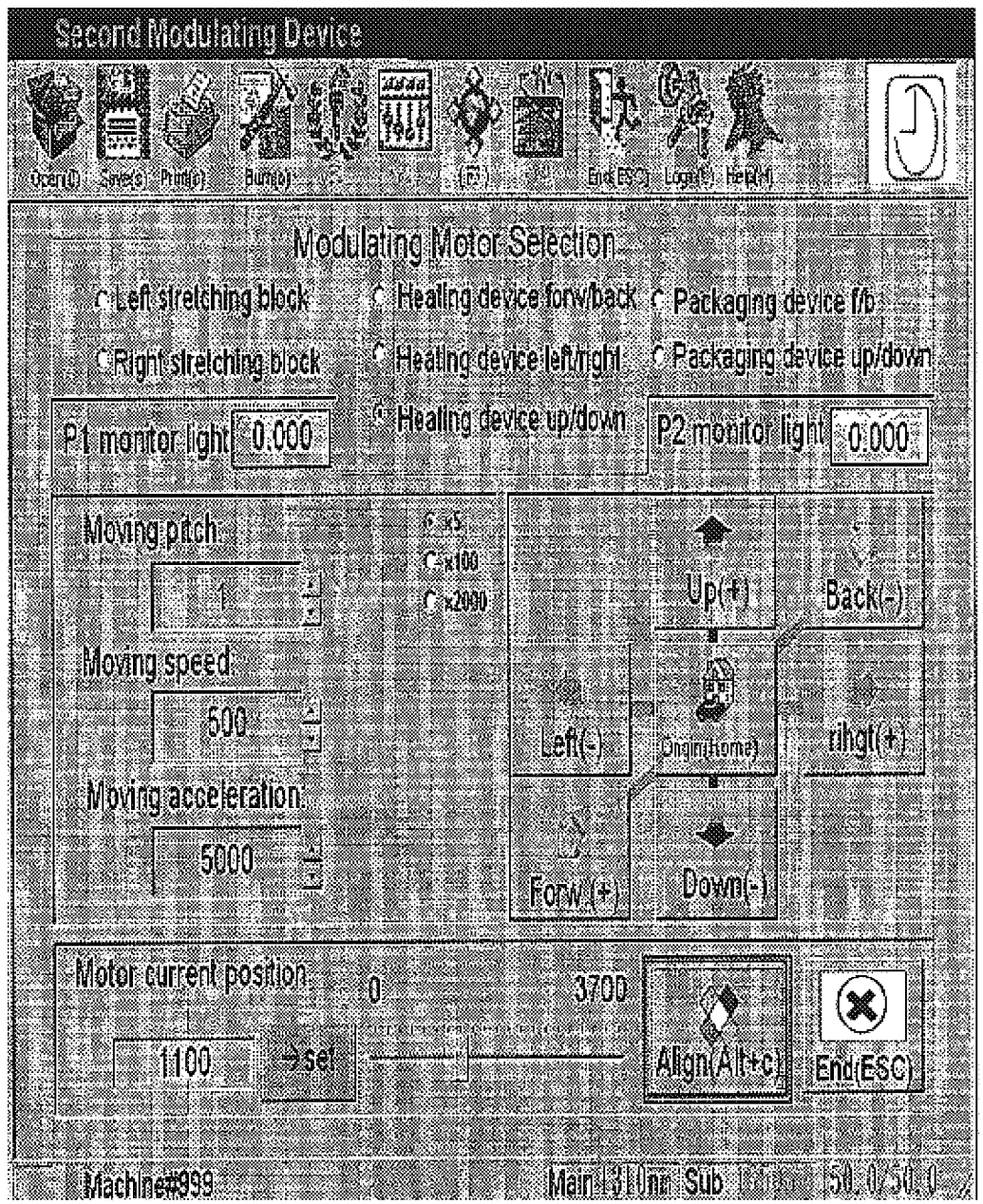
Figure 3C:
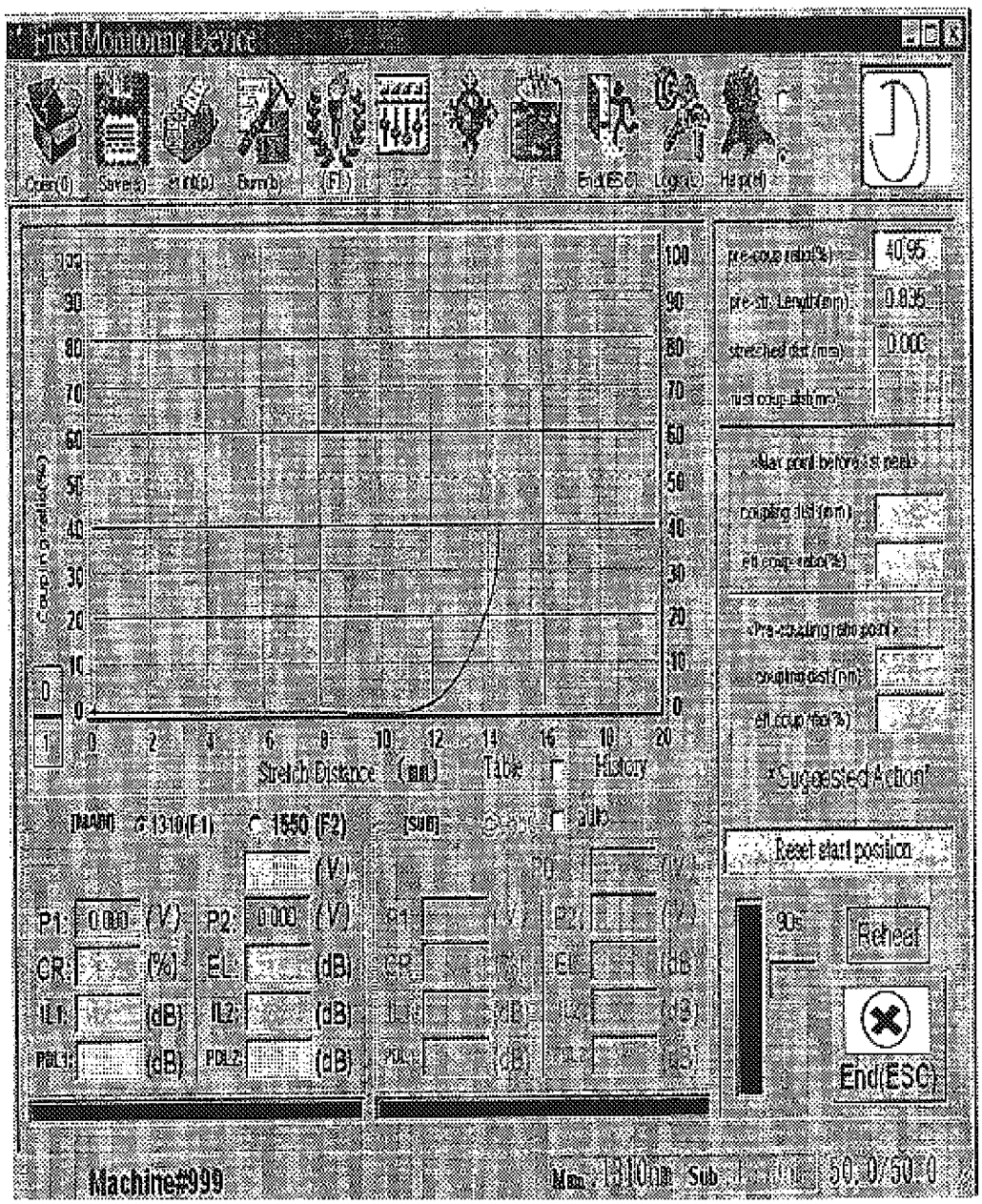

Display of the interface unit 230 in the embodiment of the present invention can be referred to FIG. 3a, FIG. 3b and FIG. 3c.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical fiber coupling system, comprising at least an optical fiber coupling device for coupling at least two optical fibers so that a contact node is formed on the optical fibers, the contact node comprising at least an input end and at least two output ends, the optical fiber coupling device comprising:

a stretching device having two relatively linearly movable stretching blocks for stretching optical fibers to be coupled by relative linear movement;

a heating device for movably fusing the contact node by a heat focusing operation;

a packaging device for movably packaging the contact node;

a first auto-control device that, when receiving a first driving signal, moves the stretching blocks to a determined position according to a first moving parameter and producing a first state parameter corresponding to the moving of the stretching blocks;

a second auto-control device that, when receiving a second driving signal, moves the heating device to a determined position according to a second moving parameter and producing a second state parameter corresponding to the moving of the heating device;

a third auto-control device that, when receiving a third driving signal, moves the packaging device to a determined position according to a third moving parameter and producing a third state parameter corresponding to the moving of the packaging device;

a first activating device that, when receiving a first activating signal, drives the heating device to perform the heat focusing operation according to a heating parameter;

a second activating device that, when receiving a second activating signal, driving the packaging device to perform the packaging; and a transmission checking device for providing a light input signal according to a digital light coupling input value to the input end of the contact node, receiving at least two corresponding light output signals from the output ends of the contact node, and producing at least two digital light coupling output values corresponding to the light output signals;

the optical fiber coupling system characterized in that the optical fiber coupling system further comprises a manufacturing process controlling device comprising:

a display;

a computing unit for respectively computing a light coupling output ratio according to each of the light coupling output values of the output ends to obtain at least a coupling ratio;

a process control unit for changing the first, second and third moving parameters and the heat parameter according to a first setup parameter, and coupling the optical fibers by producing the first driving signal in a first period, the second driving signal in a second period, the third driving signal in a third period, the first activating signal in a fourth period, and the second activating signal in a fifth period according to the coupling ratios and a second setup parameter, so that each of the coupling ratios respectively becomes a predetermined coupling ratio;

a first setup unit for directly modulating the first, second and third moving parameters, and modulating the first setup parameter;

a second setup unit for modulating the second setup parameter;

a third setup unit for modulating the coupling ratio;

a test unit for producing the digital light coupling input value; and an interface unit for displaying information in a form of window interface on the display, wherein the information comprises the first, second and third moving parameters, the first, second and third state parameters, the first and second setup parameters, the heating parameter, the coupling ratio, and the predetermined coupling ratio.

2. The optical fiber coupling system according to claim 1, wherein the first period, the second period, the third period and the fourth period partially overlap.

3. The optical fiber coupling system according to claim 2, wherein the manufacturing process controlling device is provided in a computer.

4. The optical fiber coupling system according to claim 3, wherein each of the first, second and third moving parameters comprises a plurality of position parameters and speed parameters of a predetermined moving position of the stretching blocks, the heating device and the packaging device.

5. The optical fiber coupling system according to claim 3, wherein the first setup parameter comprises starting position parameters corresponding to origin positions of the stretching blocks, a stretching speed parameter defined by a speed of the stretching blocks in stretching the optical fibers, a heat energy parameter corresponding to energy applied in the focusing heat process of the heating device, and a package position parameter corresponding to a package position of the packaging device.

6. The optical fiber coupling system according to claim 3, wherein the second setup parameter comprises a heating delay parameter related to a first delay corresponding to a difference between commencement of the first period and commencement of the fourth period.

7. The optical fiber coupling system according to claim 3, wherein the process control unit reproduces the first driving signal in a sixth period, and the second setup parameter comprises a cooling delay parameter related to a second delay corresponding to a difference between conclusion of the fourth period and commencement of the sixth period.

8. The optical fiber coupling system according to claim 3, wherein the second setup parameter further comprises a pre-coupling parameter related to a pre-coupling ratio, and the process control unit controls the conclusion of the fourth period in accordance with variation of the coupling ratio so that the heating device stops focusing heat on the optical fibers when the coupling ratio reaches the pre-coupling ratio.

9. The optical fiber coupling system according to claim 3, wherein the manufacturing process controlling device further comprises a login unit for defining at least one linking correlation controlling any of the optical fiber coupling devices.

10. The optical fiber coupling system according to claim 3, wherein the manufacturing process controlling device further comprises a storage device having a first database, the first database storing the first and second setup parameters, the heating parameter, the first, second and third moving parameters, and the predetermined coupling ratio.

11. The optical fiber coupling system according to claim 3, wherein the storage device has a second database for storing the first, second and third state parameter and the coupling ratio change in a sequence of time.

12. The optical fiber coupling system according to claim 3, wherein the manufacturing process controlling device comprises a first checking device for comparing the light coupling input value with the light coupling output values according to a first standard value to obtain a corresponding first checking data.

13. The optical fiber coupling system according to claim 12, wherein the storage device comprises a third database for storing the first standard value, and a fourth database for storing the first checking data.

14. The optical fiber coupling system according to claim 3, wherein the manufacturing process controlling device comprises a second checking device for producing the predetermined first, second and third moving parameters and the first, second and third driving signals according to a predetermined second standard value, and checking the first, second and third state parameters to obtain a corresponding second checking data.

15. The optical fiber coupling system according to claim 14, wherein the second checking device performs the checking when no optical fibers are installed in the optical fiber coupling device.

16. The optical fiber coupling system according to claim 15, wherein the storage device comprises a fifth database for storing the second standard value, and a sixth database for storing the second checking data.

17. The optical fiber coupling system according to claim 3, wherein the manufacturing process controlling device comprises a third checking device for checking input and output of the plurality of signals between the manufacturing process controlling device and the optical fiber coupling device according to a third standard value to obtain a corresponding third checking data.

18. The optical fiber coupling system according to claim 17, wherein the storage device comprises a seventh database for storing the third standard value, and a eighth database for storing the third checking data.

19. The optical fiber coupling system according to claim 3, wherein the manufacturing process controlling device comprises a monitoring device for monitoring any of the linking correlations to obtain a corresponding fourth checking data.

20. The optical fiber coupling system according to claim 19, wherein the storage device comprises a ninth database for storing the fourth checking data.

21. The optical fiber coupling system according to claim 3, wherein the manufacturing process controlling device comprises a data locking device for performing a locking process of the first and second setup parameter, the heating parameter, the first, second and third moving parameters, and the predetermined coupling ratio of any of the optical fiber coupling devices.

22. The optical fiber coupling system according to claim 21, wherein the locking process comprises a password setting process.

* * * * *